United States Patent Office 2,726,235
Patented Dec. 6, 1955

2,726,235

METHOD FOR THE SEPARATION OF PROTEINS

Leo Rane, Chestnut Hill, and Lloyd R. Newhouser, United States Naval Hospital, Chelsea, Mass.

No Drawing. Application March 2, 1953,
Serial No. 339,945

13 Claims. (Cl. 260—112)

(Granted under Title 35, U. S. Code (1952), sec. 266)

The invention described herein may be manufactured and used by or for the Government of the United States of America for governmental purposes without the payment of any royalties thereon or therefor.

This invention relates to a method for the separation and recovery of proteins from animal or vegetable fluids such as blood, milk, liver extract or corn extract, or from industrial wastes bearing proteins.

Methods for precipitating proteins from material containing a plurality of proteins have been proposed heretofore. However, these prior art methods have disadvantages which are not attendant to the present invention.

It is an object of this invention to provide a new and simple method for precipitating proteins from complex proteinaceous materials.

Another object of this invention is to provide a method for fractional precipitation and recovery of proteins from materials containing recoverable amounts of different proteins.

A more specific object of this invention is to provide a process for enrichening the relative concentrations of proteins in solutions containing a variety of proteins.

An additional object of this invention is to provide a method for producing a stable anti-shock solution rich in albumin suitable for intravenous injections.

Still another object is to provide a method of separation of proteins from blood plasma whereby the desired protein fractional precipitates are substantially free of the precipitating agent.

A still further object is to provide a method for precipitating proteins from blood plasma whereby the supernatant is rich in gamma globulin protein.

Other objects and many of the attendant advantages of this invention will be readily appreciated as the same becomes better understood by reference to the description hereinafter set forth.

As is well known, phosphate salts, as, for example, hexametaphosphates, have been employed heretofore to precipitate proteins, the latter precipitating as a protein-phosphate complex. Precipitation of proteins by hexametaphosphates is preferably confined to processes where the chief object is the removal rather than the recovery of proteins. However, where the recovery of proteins is the chief object, further treatment of the protein-phosphate precipitate is necessary. The complex must be separated from the supernatant and treated with a suitable alkali in order to dissociate the constituents of the complex. In order to facilitate separation, the alkali preferably is of a type capable of forming an insoluble alkali phosphate precipitate. If an alkali is used that forms a soluble alkali phosphate, dialysis must be resorted to for separation of the alkali phosphate. The protein remains in solution and is obtained in solid form by heat drying the solution.

The present invention contemplates precipitation and recovery of proteins from proteinaceous material by means of sodium tetrametaphosphate. The behavior of this precipitating agent is different from that of other phosphates heretofore employed in that the proteins apparently precipitate without forming a proteinphosphate complex and the precipitating agent remains in solution in the supernatant. The unusual behavior of the sodium tetrametaphosphate is believed to be due to the cyclic structure attributed to the molecule. A discussion of the cyclic structure of the tetrametaphosphate ion is presented by Bell et al. in their article "Preparation of Sodium Tetrametaphosphate," Ind. & Eng. Chem., vol. 44, pp. 568–72 (1952).

The ability of this reagent to precipitate proteins is dependent upon the hydrogen ion concentration of the protein-containing fluid to be treated. Thus, addition of a solution of "Cyclophos," a commercially available sodium tetrametaphosphate which exhibits a pH of about 6.6, to a protein-containing solution such as whey produces no visible reaction or precipitation. However, if an acid or an acid salt is also added to lower the pH to a proper level, proteins will be precipitated. The two steps may be carried out simultaneously or in succession, either step first. Preferably the tetrametaphosphate is added first to eliminate the possibility of local denaturization of the protein by the acid or acid salt. The proteins precipitate without any trace of denaturization and are easily separated from the supernatant.

The precipitation may be carried out at room temperature or at reduced temperatures without denaturization. This is a material advantage over other prior art methods which must be carried out at temperatures in the vicinity of 0° C. in order to avoid wrecking proteins. Heating above room temperature is not necessary and is not recommended since it is well known that proteins are wrecked at high temperatures.

Although the present invention is applicable to recovery of proteins from industrial wastes and animal and vegetable extracts in general, it is particularly adaptable to precipitation of proteins from human blood or the blood of horses, sheep, pigs and cows.

As is well known various protein components are found in blood. Chief among these are fibrinogen, globulins and albumins, each having their own biochemical and physiological functions. A well recognized function of albumin is in maintaining the water balance between the blood and the tissues of the body. Thus, although blood plasma itself is usually employed to reduce the injurious effects of shock resulting from sudden reduction in blood or fluid volume in the body, in many cases the same beneficial results may be obtained by injecting intravenously a protein solution rich in albumin. Thus it is desirable to isolate albumin from the other proteins in blood plasma.

Fibrinogen and globulins, of course, have numerous uses, both industrially and clinically. Fibrinogen, for example, is a clotting agent and has also been employed in the manufacture of plastics. Globulins have also been adapted to the latter industrial use, and gamma globulin has been suggested for use prophylactically and in the treatment of poliomyelitis and measles. Consequently, it is equally desirable to provide a method for recovering fibrinogen and globulins.

In treating blood plasma according to this invention, fibrinogen and globulins commence to precipitate out at a pH of approximately 5 and are easily separated from the supernatant. Traces of albumin appear in a pH range of 4.4 to 4.9, but albumin commences to precipitate in quantity at a pH of about 4.2. Complete recovery of albumin may be hastened by lowering the pH further, preferably in the range of 3.5 to 4.2. Acidification beyond 3.5 to any great degree is to be avoided due to the possibility of denaturing the proteins. However, where the subsequent intended use is not affected by the presence of denatured proteins, the pH may be lowered below 3.5 to assure complete recovery of all proteins.

Due to the fact that the protein constituents of blood plasma precipitate at different values of pH, it is possible to enrich the relative concentrations of the proteins in solution and to precipitate successive protein fractions, the constitutions of which may be varied according to the pH range in which the fractions are precipitated. These fractions, may, for example, comprise largely fibrinogen or globulins or albumin or mixtures thereof.

For example and without limitation as to the scope of the invention, where albumin is desired to be recovered in an undenatured state from blood plasma, a preferred procedure is to add sodium tetrametaphosphate to a sample of blood plasma in amounts equal to 1 gram of tetrametaphosphate for each 100 cc. of plasma, add sufficient acid to lower the pH to about 4.4 whereby a precipitate rich in fibrinogen and alpha and beta globulins is obtained, separate the precipitate from the supernatant, and add sufficient acid to the supernatant to lower the pH to within the range of 3.5 to 4.2, preferably about in the range of 3.8 to 4.0 whereby a precipitate rich in albumin is obtained. The latter is separated from the supernatant. If the albumin is desired in solid form, it may be treated in a conventional manner, as, for example, by drying under vacuum, or by passing dry gases over the wet precipitate. The fraction obtained at a pH at or above 4.4 may be similarly treated for subsequent use. Alternatively, the separated albumin fraction may be dissolved in water for subsequent clinical use. Since the wet precipitate is somewhat acidic due to the acid previously introduced to the plasma, readjustment of the pH above the isoelectric point of albumin is necessary in order for the precipitate to dissolve. This is accomplished by addition of a suitable alkaline material to the water containing the precipitate. The resulting solution rich in albumin is stable and is suitable for intravenous injection to combat shock. If desired, a fraction obtained according to the present method may be redissolved and fractional precipitation repeated to further enrich the relative concentration of a particular constituent. Alternate procedures well known to one skilled in the art may be employed for obtaining a particular protein constituent in the pure state from a fractional precipitate obtained in the practice of this invention. A preferred procedure comprises extracting the desired constituent by means of an organic precipitant such as ethanol according to the teachings set forth in U. S. Patent 2,469,193, issued May 3, 1949.

By way of example but without restriction of the term "acid," citric, ascorbic, lactic, acetic, nitric, and hydrochloric acids are effective. Acid salts such as sodium bisulfate are also suitable. As examples but without limitation of the term "alkali," NaOH, KOH, NH$_4$OH and Na$_2$HPO$_4$ are suitable for readjusting the pH to dissolve recovered protein fractions in water or in the supernatant from which they were obtained.

So far as the chemical aspect of the invention is concerned, any inorganic or organic acid may be used to vary the pH so long as it does not form a water-insoluble compound with protein and is of sufficient strength to produce the desired pH values at which protein fractions will precipitate. However, although the choice of acid and base is practically unlimited from a chemical standpoint, the choice of both acid and base is controlled by the ultimate use intended for the recovered proteins, especially where the proteins are to be clinically administered.

By this invention it is possible to recover denatured as well as undenatured proteins where both exist in the materials to be treated. If denatured proteins are not initially present, the precipitate will also be free of denatured proteins since denaturization does not result during precipitation according to this invention.

The present invention has been applied to treatment of plasma in various states of condition with equally excellent results as, for example, fresh uncontaminated plasma, fresh plasma contaminated with hemoglobin, plasma from outdated blood, liquid plasma stored at room temperatures for various periods of time, frozen fresh plasma, and dried plasma.

The following example is specific illustration of the fractional precipitation and the enrichment of relative concentrations of proteins obtainable by practice of this invention:

To a 25 cc. sample of plasma from outdated whole blood there was added 5 cc. of 10% sodium tetrametaphosphate. No precipitation was observed. Then 1 cc. of 5% hydrochloric acid was added to lower the pH to 5.5. A precipitate appeared which was separated and redissolved in distilled water by addition of sodium hydroxide. Measurement of the pH gave a reading of approximately 7. Upon analysis the redissolved precipitate was found to contain the following:

Albumin _____ .2 grams/100 cc.
Globulin _____ .4 grams/100 cc.

To the supernatant was added 2.5 cc. of the same acid to lower the pH to about 4.1. The resulting precipitate was separated and redissolved in distilled water by addition of sodium hydroxide. Upon analysis the redissolved precipitate was found to contain the following:

Albumin _____ 1.9 grams/100 cc.
Globulin _____ .4 grams/100 cc.

Several phenomena observed in the practice of this invention lead to the conclusion that the proteins are not precipitated as a protein-phosphate complex. First of all, flame photometer tests indicate the absence in the precipitated proteins of sodium in amounts greater than normally occurs in blood protein. This is explained by the observed increase in the supernatant of sodium in amounts corresponding to the amount introduced upon addition of sodium tetrametaphosphate precipitant. Secondly, tests for phosphorus according to conventional chemical procedures indicate that phosphorus also is present in the precipitated proteins in amounts not greater than normally occurs in blood protein. As with sodium, tests on the supernatant revealed an increase of phosphorus in amounts corresponding to the amount introduced upon addition of sodium tetrametaphosphate reagent.

The supernatant remaining after precipitation of proteins from blood plasma according to this invention is rich in gamma globulin and contains only traces of alpha and beta globulins. The latter are found to reside predominantly in the precipitated fractions. Gamma globulin may be recovered from the supernatant by means of alcohols or by other conventional methods such as dialysis to lower the ionic concentration, or by freezing and drying the supernatant to concentrate the gamma globulin. Freezing and drying is permissible and satisfactory since gamma globulin is usually administered intramuscularly or by methods other than intravenously, and when so applied the presence of sodium, potassium or phosphorus is not injurious. The following example illustrates the relative concentrations of the various globulins in the supernatant as well as further showing the relative concentration of albumin and globulins in the precipitated fractions.

To 400 cc. of highly hemolyzed plasma a 10% solution of sodium tetrametaphosphate was added in an amount sufficient to provide about 1 gram of sodium tetrametaphosphate salt for each 100 cc. of plasma. Citric acid was then added to lower the pH stepwise to 4.07, fractional precipitates being obtained at intermediate values of pH. These precipitates were analyzed for protein constituents chemically and electrophoretically. The amounts of each protein in terms of grams per 400 cc. were determined to be as follows:

| pH | Fibrinogen | Alpha Globulin | Beta Globulin | Gamma Globulin | Albumin |
|---|---|---|---|---|---|
| 4.9 | .35 | .19 | | | .06 |
| 4.4 | .61 | .33 | | | .27 |
| 4.2 | .77 | 1.12 | 1.05 | | 5.41 |
| 4.07 | | .89 | .50 | | 6.31 |

Electrophoretic patterns obtained upon analysis of the supernatant revealed the following constituents:

| Alpha Globulin | Beta Globulin | Gamma Globulin |
|---|---|---|
| .16 | -------- | 4.14 |

The fibrinogen constituents of the fraction obtained at pH values of 4.9 and 4.4 were exposed to thrombin. The fibrinogen clotted in the usual manner, indicating that the fibrinogen was not denatured.

Obviously many modifications and variations of the present invention are possible in the light of the above teachings. It is therefore to be understood that within the scope of the appended claims the invention may be practiced otherwise than as specifically described.

We claim:

1. A method of precipitating proteins from a solution containing proteinaceous material comprising adding sodium tetrametaphosphate to said solution, and lowering the solution pH to precipitate the proteins.

2. A method as defined by claim 1 wherein the solution of proteinaceous material is blood plasma.

3. A method as defined by claim 1 wherein the pH is lowered to approximately 3.5.

4. A method for the recovery of gamma globulin from blood plasma comprising adding sodium tetrametaphosphate to blood plasma, adjusting the pH by addition of acid to precipitate substantially all of the albumin present in the blood plasma, separating the precipitate, and recovering gamma globulin from the supernatant.

5. A method as defined by claim 4 wherein the gamma globulin is recovered from the supernatant by means of an organic precipitant.

6. A method for the fractionation of proteins from a solution containing proteins comprising adding sodium tetrametaphosphate to said solution, and precipitating a plurality of successive fractions by variation of the pH of the solution.

7. A method for the recovery of a fractional precipitate rich in albumin from blood plasma comprising adding sodium tetrametaphosphate to a sample of blood plasma, adjusting the pH to precipitate a fraction rich in globulin, separating said fraction from the supernatant, and adjusting the pH to a lower level to precipitate a second fraction rich in albumin.

8. A method for rendering blood plasma rich in albumin and gamma globulin comprising adding sodium tetrametaphosphate to a sample of blood plasma, adjusting the pH of the plasma to precipitate a fraction rich in globulins, and separating the fractional precipitate from the plasma.

9. A method for obtaining a stable anti-shock solution rich in albumin comprising adding sodium tetrametaphosphate to blood plasma, lowering the pH to about 4.4, separating the resulting precipitate, lowering the pH of the supernatant further to a level within the range of 3.5 to 4.2, separating the resulting precipitate, immersing said second precipitate in water, and adjusting the pH of the water to dissolve said second precipitate.

10. A method for obtaining a stable anti-shock solution rich in albumin comprising adding sodium tetrametaphosphate to blood plasma, lowering the pH to about 4.4, separating the resulting precipitate, lowering the pH of the supernatant further to a level within the range of 3.8 to 4.0, separating the resulting precipitate, immersing said second precipitate in water, and adjusting the pH of the water to dissolve said second precipitate.

11. A method for obtaining albumin in solid undenatured form comprising, adding sodium tetrametaphosphate to blood plasma, lowering the pH to within the range of approximately 4.4 to 5 to precipitate a protein fraction comprising predominently fibrinogen and globulins, separating said fraction, lowering the pH of the supernatant further to within the range of 3.8 to 4.0 to precipitate a protein fraction rich in albumin, and recovering said fraction from the supernatant.

12. A method of precipitating proteins from an acid solution containing proteinaceous material comprising adding sodium tetrametaphosphate to said solution.

13. A method of precipitating proteins from a solution comprising executing in any order preferred the steps of adding sodium tetrametaphosphate to said solution and lowering the pH to a predetermined value.

References Cited in the file of this patent

UNITED STATES PATENTS

| 2,377,624 | Gordon | June 5, 1945 |
| 2,429,579 | Horvath | Oct. 21, 1947 |
| 2,467,453 | Almy et al. | Apr. 19, 1949 |
| 2,520,076 | Williams et al. | Aug. 22, 1950 |

OTHER REFERENCES

Anson et al.: "Advances in Protein Chem.," vol. III, pp. 422–6.